INVENTOR.
ERNEST L. SCHLAGE

Sept. 16, 1958     E. L. SCHLAGE     2,852,294
SPINDLE ALIGNING DEVICE

Filed May 1, 1956                 2 Sheets—Sheet 2

INVENTOR.
ERNEST L. SCHLAGE
BY Boyken Mohler & Wood

United States Patent Office 2,852,294
Patented Sept. 16, 1958

2,852,294

SPINDLE ALIGNING DEVICE

Ernest L. Schlage, Burlingame, Calif., assignor to Schlage Lock Company, a corporation Application May 1, 1956, Serial No. 582,003

7 Claims. (Cl. 292—169)

This invention relates to door locks having inner and outer independently operated spindles and especially to improvements in the structure and operation of the outer spindle and the roll back carried thereby.

In my copending application entitled Spindle Locking Construction, filed January 23, 1956, Serial No. 560,664, an improved door lock is disclosed which prevents transmission of a shock wave from the outer spindle and roll back to the retractor. As disclosed in that application and in this application shock wave transmission is overcome or prevented by maintaining a clearance or spacing between the roll back on the outer spindle and the thrust plate on the retractor; the spacing being sufficient to prevent the roll back from contacting the retractor when the outer knob is struck with a rubber-faced hammer or like implement. This spacing of the roll back with relation to the retractor while preventing shock wave transmission has one draw back in that it leaves the outer spindle and knob free to rotate in either direction to a limited degree depending upon the amount of spacing or clearance employed. This free rotation is objectionable for several reasons, first, for instance, when the door lock is installed in cabin doors on ships, where propeller vibration may cause the outer knob to rattle to such a degree as to be quite noticeable and annoying; the same objection being met with on railway coaches and in buildings where heavy machinery is operated. Secondly, when a lock of this character is provided with a push button actuated dogging mechanism, the slot in the spindle will not always align with the dog and may prevent operation of the dogging mechanism.

The object of the present invention is to provide means for resisting free rotation of the outer knob together with its spindle and its roll back member, and further, to so arrange the resisting mechanism that it will align the slot in the spindle with the dog and thus insure operation of the button actuated dogging mechanism.

The invention is shown by way of illustration in the accompanying drawings, in which.

Figure 1:
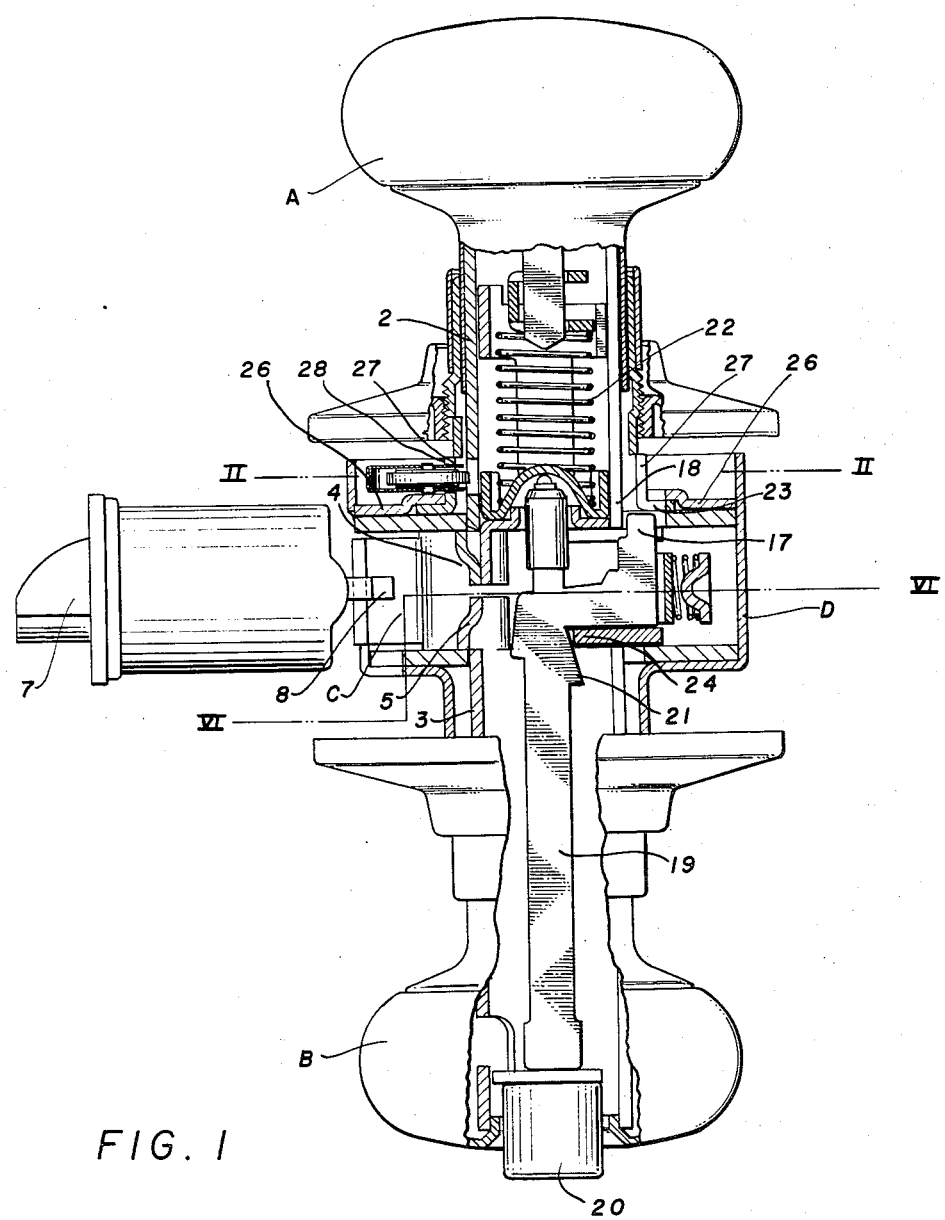
Fig. 1 is a horizontal, longitudinal section of the door lock showing the main parts of the mechanism.
Figure 6:
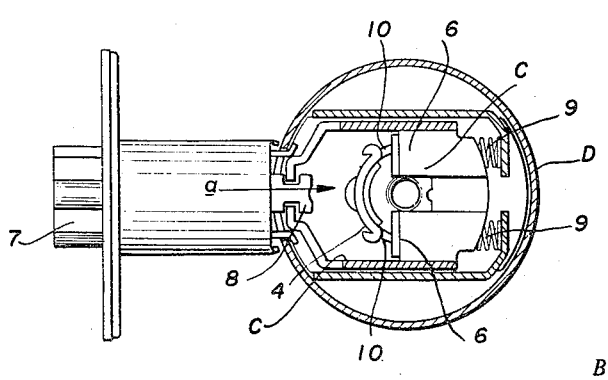
Fig. 6 is a cross section on a reduced scale taken on line VI—VI, Fig. 1.
Figure 7:
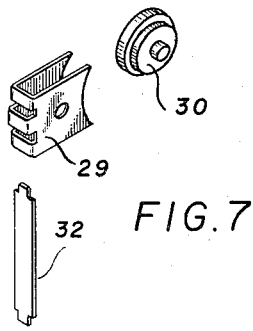
Fig. 7 is a perspective view of the several parts forming the mechanism whereby resistance is applied to the outer spindle to prevent free rotation thereof.

Referring to the drawings in detail and especially Fig. 1, 2 indicates the outer spindle with its knob A, and 3 indicates the inner spindle with its knob B. Both spindles are of tubular construction, and both spindles are provided with a roll back member such as indicated at 4 and 5. Both of the roll back members are provided for the purpose of imparting retracting movement to a retractor generally indicated at C, see Fig. 6, and this is accomplished by rotation of either spindle by means of its knob. During such rotation the roll back engages a thrust plate 6 on the retractor, and forces the retractor as a whole in the direction of arrow a, and as the retractor is connected to a latch bolt 7 in the usual manner as shown at 8, the latch bolt moves in unison with the retractor and as such is withdrawn and the door in which the lock is mounted may be opened, on the other hand, if the knob is released a pair of springs 9 which were compressed during withdrawal of the latch bolt will exert their combined pressure on the thrust plate and thus return the retractor with connected latch bolt to normal extended or projected position, and will at the same time return the roll back members together with their spindles and knobs to normal position. The operation just described applies to the inner spindle with its roll back and knob only, as the roll back on the inner spindle is in contact with the thrust plate on the retractor at all times, but it does not apply to the outer spindle with its roll back and knob as a predetermined clearance is maintained between the roll back and the thrust plate as indicated at 10, see Fig. 6.

It has been demonstrated that a shock wave imparted to the spindle and roll back member by striking the outer knob with a rubber-faced hammer may transmit sufficient movement to the retractor to release a dogging mechanism which secures the outer spindle and knob against rotation. The dogging mechanism comprises a dog 17 which is adapted to enter a slot 18 formed in the outer spindle. The dog, see Fig. 1, is formed adjacent the inner end of a bar 19 which extends longitudinally of and through the inner spindle. The bar has a push button 20 on its outer end, and close to the dog 17 is formed a latch 21. The bar 19 which carries the push button, the latch and the dog is normally maintained in the position shown in Fig. 1 where the push button extends outwardly from the face of the inner knob B by means of a spring 22, however, if the button is depressed, dog 17 which is guided by a slot 23 formed in the housing of the lock will enter slot 18 of the outer spindle, and the dog will be retained in this position as latch 21 will engage the inner face of a shoulder 24 formed on the retractor. When the dog is held by the latch the dog as already stated has entered the slot 18, and in this position dogs or locks the outer spindle together with its roll back and knob against rotation. The latch 21 is the only means provided for maintaining the dog in dogging position, hence, the importance of preventing shock wave transmission or movement to the retractor. A one-eighth of an inch movement can readily be transmitted by shock wave transmission, and this is obviously more than sufficient to release latch 21, and if it is released, spring 22 will instantly return the push button bar 19 and thus retract the dog from the slot and thereby release the outer spindle to permit free rotation thereof and opening of a door from the exterior.

From the foregoing it must be apparent that the clearance maintained between the roll back on the outer spindle and the retractor to prevent shock wave transmission or movement to the retractor is important. The clearance may be only one-sixteenth of an inch or less, see Fig. 6, but even so, it leaves the outer knob with its spindle and roll back member free to rotate in either direction until the roll back engages the thrust plate on the retractor. This free rotational movement causes rattle as heretofore referred to, and even though the free rotation may be less than 10 degrees in either direction, it is sufficient to bring the slot 18 formed in the outer spindle out of alignment with the dog 17, and as such, might prevent depression of the push button when it is desired to dog the outer spindle and knob against rotation, for this reason, means are provided for aligning the slot with relation to the dog when the spindle and knob is to be dogged against rotation.

The main purpose of the present invention is to provide a mechanism which will accomplish two main functions, first, resist free rotation of the outer spindle to a degree that rattle of the outer knob and spindle will be prevented, and secondly, that alignment between the slot and the outer spindle and the dogging mechanism will be insured.

The mechanism employed is best shown in Figs. 1, 2, 3, 6 and 7. By referring to Fig. 1 it will be noted that the main housing D of the door lock is provided with an end plate 26, and that this plate carries a hub section 27 through which the inner end of the outer spindle 2 extends. A slot 28 is formed in the hub 27 and extending into the slot and guided thereby is a yoke-shaped member 29, see Figs. 1 and 7, in which is journaled a roller 30. This roller rides on the outer surface of the spindle 2 when this is rotated by means of the knob, see Fig. 3, but when the knob and spindle are returned to substantially normal position, the roller enters a depression or slot 31 formed in the spindle, and is forced into the slot, see Fig. 2, by means of a spring 32 interposed between the outer end of the yoke 29 and the housing D. The spring 32, the yoke 29 and the roller 30 function in the manner of a spring actuated yielding detent when the spindle 2 assumes the position shown in Fig. 2, and as such applies sufficient resistance to prevent free rotation of the spindle and thereby prevents rattle, also, the yielding detent-like mechanism maintains slot 18 in alignment with the dog 17, thus insuring smooth and dependable operation of the push button 20 and the mechanism actuated thereby.

Figure 4:
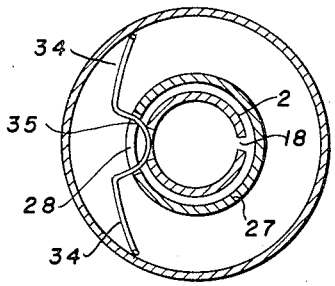
Figs. 4 and 5 are cross sections similar to Figs. 2 and 3. Said cross sections showing a modified form of the mechanism whereby free movement of the outer spindle is resisted.
Figure 5:
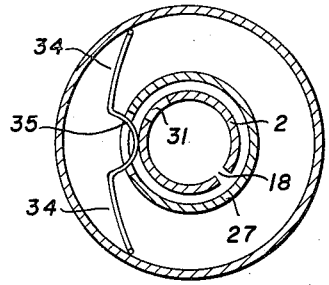
Figure 2:
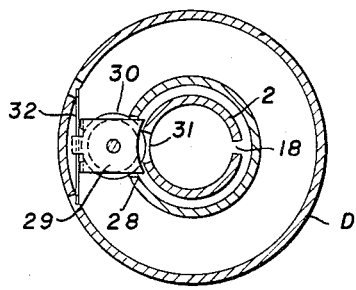
Figs. 2 and 3 are cross sections on a reduced scale taken on line II—II of Fig. 1. Said cross sections showing a mechanism whereby free movement of the outer spindle is resisted.
Figure 3:
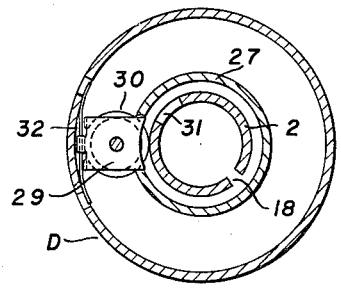

In Figs. 4 and 5 a spring having two arms 34 and a central detent portion 35 is shown. The detent extends through the slot 28 and engages the spindle 2, and as such serves the same function as the roller 30.

It should be understood that the very detailed description of the invention herein given is not to be taken as restrictive thereof but merely as preferred embodiments, and that various modifications in design may be made without departing from the spirit of the invention.

Having thus described my invention what I desire to claim and secure by Letters Patent is:

1. In a lock structure of the character described, a housing, a retractor reciprocally mounted therein, said retractor having a thrust plate, a rotatable knob spindle journaled in the housing, a roll back member on the spindle engageable with the thrust plate to transmit reciprocal movement thereto, said roll back being normally out of engagement with the thrust plate so that a predetermined rotational movement of the spindle must take place before engagement is made with the thrust plate, and yieldable means engaging said spindle at a point axially spaced along said spindle from said rollback for resisting the predetermined rotational movement of the spindle and the roll back member.

2. In a lock structure of the character described, a housing, a retractor reciprocally mounted therein, said retractor having a thrust plate, a rotatable knob spindle journaled in the housing, a roll back member on the spindle engageable with the thrust plate to transmit reciprocal movement thereto, said roll back being normally out of engagement with the thrust plate so that a predetermined rotational movement of the spindle must take place before engagement is made with the thrust plate, a depression formed in the outer surface of the spindle at a point spaced axially along said spindle from said rollback, and a spring actuated detent normally entering the depression and resisting the predetermined rotational movement of the spindle and the roll back member.

3. In a lock structure of the character described, a housing, a retractor reciprocally mounted therein, said retractor having a thrust plate, a rotatable knob spindle journaled in the housing, a roll back member on the spindle engageable with the thrust plate to transmit reciprocal movement thereto, said roll back being normally out of engagement with the thrust plate so that a predetermined rotation movement of the spindle must take place before engagement is made with the thrust plate, a depression formed in the outer surface of the spindle, and a spring actuated roller normally resting in the depression, and resisting the predetermined rotational movement of the spindle and the roll back member.

4. In a lock structure of the character described, a housing, a retractor reciprocally mounted therein, said retractor having a thrust plate, a rotatable knob spindle journaled in the housing, a roll back member on the spindle engageable with the thrust plate to transmit reciprocal movement thereto, said roll back being normally out of engagement with the thrust plate so that a predetermined rotational movement of the spindle must take place before engagement is made with the thrust plate, a slot formed in the spindle, a dogging member movable into the slot to dog the spindle against rotation, and a yieldable member positioned radially outwardly of said spindle and supported for movement radially inwardly thereof into engagement with the spindle, and normally maintaining the slot in the spindle in alignment with the dogging member.

5. In a lock structure of the character described, a housing, a retractor reciprocally mounted therein, said retractor having a thrust plate, a rotatable knob spindle journaled in the housing, a roll back member on the spindle engageable with the thrust plate to transmit reciprocal movement thereto, said roll back being normally out of engagement with the thrust plate so that a predetermined rotational movement of the spindle must take place before engagement is made with the thrust plate, a slot formed in the spindle, a dogging member, manually actuated means for moving the dog into the slot to dog the spindle against rotation, and a yieldable member positioned radially outwardly of said spindle and supported for movement radially inwardly thereof into engagement with the spindle, said yieldable member resisting the predetermined rotational movement of the spindle and roll back member and also maintaining the slot in the spindle in alignment with the dogging member.

6. In a lock having a retractor connected with the bolt of said lock and slidably supported for translation from an outer position with said bolt projected to an inner position with said bolt retracted, a knob spindle provided with a roll back adapted to engage said retractor for retracting the same upon rotation of said spindle, said spindle having a neutral position at which said roll back is spaced from said retractor, means positioned radially outwardly of said spindle and spring urged into engagement with said spindle for yieldably holding the same in said neutral position and for yieldably resisting rotation of said spindle from said neutral position.

7. In a lock having a retractor connected with the bolt of said lock and slidably supported for translation from an outer position with said bolt projected to an inner position with said bolt retracted, a knob spindle provided with a roll back adapted to engage said retractor for retracting the same upon rotation of said spindle, a dogging element supported for movement into locking engagement with said spindle when the latter is in a predetermined neutral position for locking said spindle against rotation, and a spring positioned radially outwardly of said spindle and urged into engagement with said spindle for yieldably holding the same in said neutral position and for yieldably resisting rotation of said spindle from said neutral position.

References Cited in the file of this patent

UNITED STATES PATENTS

| | | |
|---|---|---|
| 2,217,131 | Nilsson | Oct. 8, 1940 |
| 2,618,955 | Cerf | Nov. 25, 1952 |
| 2,747,907 | Golden et al. | May 29, 1956 |